(12) United States Patent
McGill

(10) Patent No.: US 7,938,574 B2
(45) Date of Patent: *May 10, 2011

(54) MIXING APPARATUS

(75) Inventor: Shane Robert McGill, Kent (GB)

(73) Assignee: McGill Technology Limited, Kent (GB)

( * ) Notice: Subject to any disclaimer, the term of this patent is extended or adjusted under 35 U.S.C. 154(b) by 829 days.

This patent is subject to a terminal disclaimer.

(21) Appl. No.: 10/566,974

(22) PCT Filed: Aug. 9, 2004

(86) PCT No.: PCT/GB2004/003432
§ 371 (c)(1),
(2), (4) Date: Mar. 1, 2006

(87) PCT Pub. No.: WO2005/013787
PCT Pub. Date: Feb. 17, 2005

(65) Prior Publication Data
US 2006/0209627 A1 Sep. 21, 2006

(30) Foreign Application Priority Data
Aug. 7, 2003 (GB) .................................. 0318584.0

(51) Int. Cl.
*A47J 43/046* (2006.01)
(52) U.S. Cl. ......... 366/199; 366/205; 366/251; 366/314
(58) Field of Classification Search .................... 99/287, 99/348; 241/282.1; 366/204, 205, 251, 314, 366/199; 206/515
See application file for complete search history.

(56) References Cited

U.S. PATENT DOCUMENTS

| | | | | | |
|---|---|---|---|---|---|
| 1,122,955 | A | * | 12/1914 | Lang, Jr. | 206/515 |
| 1,351,243 | A | * | 8/1920 | John | 366/251 |
| 1,874,079 | A | * | 8/1932 | Black | 241/97 |
| 1,979,911 | A | * | 11/1934 | Steudel | 108/91 |
| 2,042,176 | A | * | 5/1936 | Hausman | 366/251 |
| 2,086,858 | A | * | 7/1937 | Dunkelberger | 366/314 |
| 2,097,423 | A | * | 10/1937 | Schaub | 99/456 |
| 2,130,113 | A | * | 9/1938 | Adams | 366/155.2 |
| 2,345,876 | A | * | 4/1944 | Kohrtz | 206/515 |
| 2,350,950 | A | * | 6/1944 | Wiley | 229/125.03 |
| 2,352,684 | A | * | 7/1944 | Braddock | 220/23.6 |
| 2,455,177 | A | * | 11/1948 | Irish | 366/205 |
| 2,530,124 | A | * | 11/1950 | Kieckhefer | 229/406 |

(Continued)

FOREIGN PATENT DOCUMENTS

DE 202 08 386 9/2002

(Continued)

*Primary Examiner* — David L Sorkin
*Assistant Examiner* — Andrew Janca
(74) *Attorney, Agent, or Firm* — Nixon & Vanderhye P.C.

(57) ABSTRACT

A mixing apparatus has a container base and a container lid with the lid carrying a mixing mechanism extending through the lid. The mixing mechanism includes at one end a mixing element and at the other end a drive connection to a drive motor. When the drive is operated, the mixing element mixes the contents of the container, usually with the container inverted. The lid has a rim portion with a circumferential slot, and the top edge of the container is located in the slot when the lid is assembled with the container to improve the connection between the lid and the container during mixing. The lid within the rim portion carries the mixing mechanism and during mixing, the assembly is held to lock the assembly together.

15 Claims, 10 Drawing Sheets

U.S. PATENT DOCUMENTS

Figure 1:
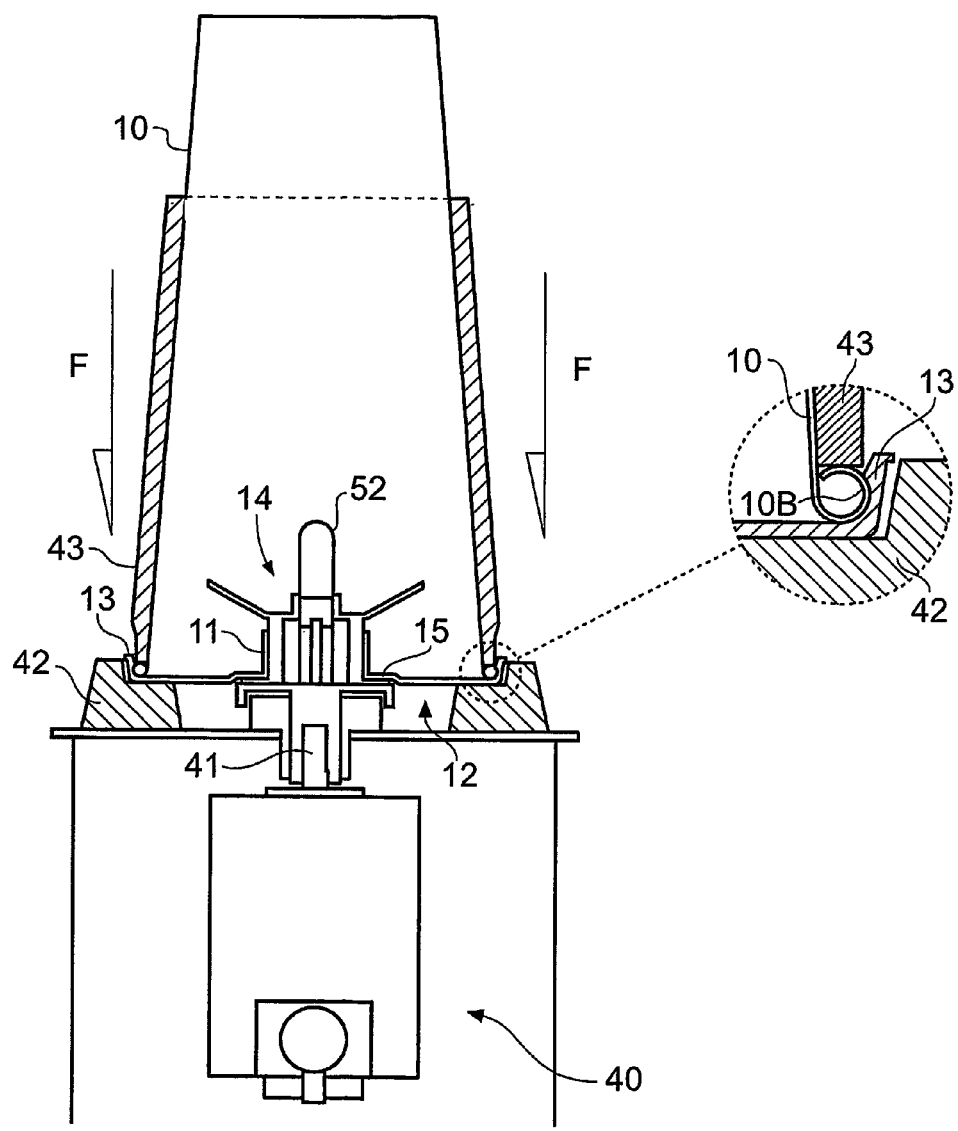

| | | | | |
|---|---|---|---|---|
| 2,544,594 | A * | 3/1951 | Goldfarb | 446/74 |
| 2,585,767 | A * | 2/1952 | Guggenheim | 366/311 |
| 2,628,081 | A * | 2/1953 | Laird | 366/264 |
| 2,695,115 | A * | 11/1954 | Roop | 220/802 |
| 2,774,576 | A * | 12/1956 | Frank, Sr. | 366/205 |
| 2,858,861 | A * | 11/1958 | Appleton | 99/503 |
| 2,940,738 | A * | 6/1960 | Posener et al. | 366/205 |
| 2,971,304 | A * | 2/1961 | O'Neil | 53/447 |
| 3,023,926 | A * | 3/1962 | Wilke | 220/781 |
| 3,064,949 | A * | 11/1962 | Dewenter | 241/195 |
| 3,080,997 | A * | 3/1963 | Brown | 220/606 |
| 3,085,281 | A * | 4/1963 | Massmam | 401/4 |
| 3,104,045 | A * | 9/1963 | Addison et al. | 229/125.26 |
| 3,112,841 | A * | 12/1963 | Martinelli | 220/380 |
| 3,135,111 | A * | 6/1964 | Roe | 73/862.17 |
| 3,263,969 | A * | 8/1966 | Adam | 366/314 |
| 3,285,331 | A * | 11/1966 | Bratland | 165/109.1 |
| 3,303,370 | A * | 2/1967 | Boes et al. | 310/228 |
| 3,315,946 | A * | 4/1967 | Nissman | 241/282.2 |
| 3,335,901 | A * | 8/1967 | Edwards | 220/781 |
| 3,489,231 | A * | 1/1970 | Tschirky et al. | 175/323 |
| 3,635,147 | A * | 1/1972 | Lee | 99/348 |
| 3,690,793 | A * | 9/1972 | Pollman et al. | 418/102 |
| 3,704,864 | A * | 12/1972 | Lee | 366/205 |
| 3,729,112 | A * | 4/1973 | Gibbs | 220/495.06 |
| 3,931,890 | A * | 1/1976 | Davis | 206/508 |
| 3,997,008 | A * | 12/1976 | Kellner | 175/45 |
| 4,057,361 | A * | 11/1977 | Renaud | 415/56.4 |
| 4,108,054 | A * | 8/1978 | Klocker et al. | 99/348 |
| 4,147,281 | A * | 4/1979 | Missale et al. | 222/192 |
| 4,480,926 | A * | 11/1984 | Lattery et al. | 366/251 |
| 4,487,509 | A * | 12/1984 | Boyce | 366/199 |
| D281,945 | S * | 12/1985 | Boyce | D7/378 |
| 4,688,478 | A * | 8/1987 | Williams | 99/503 |
| 4,708,487 | A * | 11/1987 | Marshall | 366/206 |
| 4,792,292 | A * | 12/1988 | Gaenzle | 417/440 |
| 4,811,860 | A * | 3/1989 | Sorenson et al. | 220/380 |
| 4,867,313 | A * | 9/1989 | Padovani | 206/519 |
| 4,885,917 | A * | 12/1989 | Spector | 62/343 |
| 4,889,248 | A * | 12/1989 | Bennett | 215/390 |
| 4,941,752 | A * | 7/1990 | Yant et al. | 366/307 |
| 5,088,832 | A * | 2/1992 | Gambrill et al. | 366/314 |
| 5,168,140 | A * | 12/1992 | Welker | 219/689 |
| 5,431,276 | A | 7/1995 | Lialin | |
| 5,456,380 | A * | 10/1995 | Ito et al. | 220/713 |
| 5,456,586 | A * | 10/1995 | Carson | 425/4 R |
| 5,478,149 | A * | 12/1995 | Quigg | 366/273 |
| D372,835 | S * | 8/1996 | Leverrier | D7/372 |
| 5,662,032 | A * | 9/1997 | Baratta | 99/513 |
| 5,692,617 | A * | 12/1997 | Adams | 206/508 |
| 5,727,742 | A * | 3/1998 | Lawson | 241/199.12 |
| 5,816,136 | A * | 10/1998 | Stallings | 99/335 |
| 5,911,504 | A * | 6/1999 | Schindlegger, Jr. | 366/197 |
| 5,918,761 | A * | 7/1999 | Wissinger | 220/713 |
| 5,918,767 | A * | 7/1999 | McGill | 222/95 |
| 6,071,006 | A | 6/2000 | Hochstein et al. | |
| 6,076,699 | A * | 6/2000 | Seager et al. | 220/710.5 |
| 6,082,575 | A * | 7/2000 | Skoskiewicz et al. | 220/711 |
| 6,155,161 | A * | 12/2000 | Chan | 99/348 |
| 6,164,196 | A * | 12/2000 | Deschamps et al. | 99/513 |
| 6,216,903 | B1 * | 4/2001 | Hirose et al. | 220/253 |
| 6,338,569 | B1 * | 1/2002 | McGill | 366/144 |
| 6,345,572 | B1 * | 2/2002 | Kao | 99/337 |
| 6,363,837 | B1 * | 4/2002 | Sham et al. | 99/348 |
| 6,431,744 | B1 * | 8/2002 | Ash et al. | 366/205 |
| 6,472,007 | B2 * | 10/2002 | Bezek et al. | 426/115 |
| 6,561,376 | B2 * | 5/2003 | Price et al. | 220/669 |
| 6,564,697 | B2 * | 5/2003 | Maxwell et al. | 99/287 |
| 6,659,302 | B2 * | 12/2003 | Lin | 220/254.8 |
| 6,662,978 | B2 * | 12/2003 | Lin et al. | 222/509 |
| 6,792,849 | B1 * | 9/2004 | Kim | 99/348 |
| 6,817,750 | B1 * | 11/2004 | Sands | 366/205 |
| 6,854,875 | B2 * | 2/2005 | McGill | 366/199 |
| 6,854,876 | B2 * | 2/2005 | Dickson, Jr. | 366/205 |
| 6,960,292 | B2 * | 11/2005 | Xujiang et al. | 210/149 |
| 7,147,365 | B2 * | 12/2006 | McGill | 366/199 |
| 7,168,845 | B2 * | 1/2007 | McGill | 366/204 |
| 7,178,977 | B2 * | 2/2007 | Colding-Kristensen et al. | 366/264 |
| 7,309,156 | B2 * | 12/2007 | McGill | 366/199 |
| 7,371,004 | B1 * | 5/2008 | Branson et al. | 366/130 |
| 7,377,207 | B2 * | 5/2008 | Hug et al. | 99/287 |
| 7,380,685 | B2 * | 6/2008 | Simmons et al. | 220/703 |
| 7,384,182 | B2 * | 6/2008 | Bhavnani | 366/130 |
| 7,402,092 | B1 * | 7/2008 | Randall et al. | 446/74 |
| 7,422,169 | B2 * | 9/2008 | Mueller | 241/168 |
| 7,430,957 | B2 * | 10/2008 | Sands | 99/513 |
| 7,441,944 | B2 * | 10/2008 | Sands | 366/205 |
| 7,469,627 | B2 * | 12/2008 | Li | 99/286 |
| 7,476,018 | B2 * | 1/2009 | McGill et al. | 366/197 |
| D595,537 | S * | 7/2009 | Mansfield et al. | D7/396.1 |
| 7,587,972 | B2 * | 9/2009 | Katz et al. | 99/275 |
| 7,677,435 | B2 * | 3/2010 | Stahlecker | 229/403 |
| 2002/0127307 | A1* | 9/2002 | McGill | 426/112 |
| 2004/0190373 | A1* | 9/2004 | Colding-Kristensen et al. | 366/306 |
| 2006/0209627 | A1* | 9/2006 | McGill | 366/205 |
| 2007/0109913 | A1* | 5/2007 | McGill | 366/205 |
| 2008/0037360 | A1* | 2/2008 | McGill | 366/130 |
| 2008/0057168 | A1* | 3/2008 | McGill | 426/393 |
| 2008/0202346 | A1* | 8/2008 | Accumanno et al. | 99/280 |
| 2008/0212403 | A1* | 9/2008 | Garman et al. | 366/205 |
| 2009/0109793 | A1* | 4/2009 | Xue | 366/205 |
| 2009/0277335 | A1* | 11/2009 | Baccetti | 99/297 |
| 2009/0277812 | A1* | 11/2009 | Driscoll | 206/499 |
| 2009/0277813 | A1* | 11/2009 | Linder | 206/515 |
| 2010/0005979 | A1* | 1/2010 | Baccetti | 100/37 |
| 2010/0020633 | A1* | 1/2010 | Dickson, Jr. | 366/204 |

FOREIGN PATENT DOCUMENTS

| | | |
|---|---|---|
| EP | 1 279 359 | 1/2003 |
| GB | 1 388 331 | 3/1975 |
| KR | 1996-0007233 | 8/1996 |
| WO | WO 03/002241 A1 * | 1/2003 |
| WO | WO 03/101855 | 12/2003 |
| WO | WO 2004/002281 | 1/2004 |

* cited by examiner

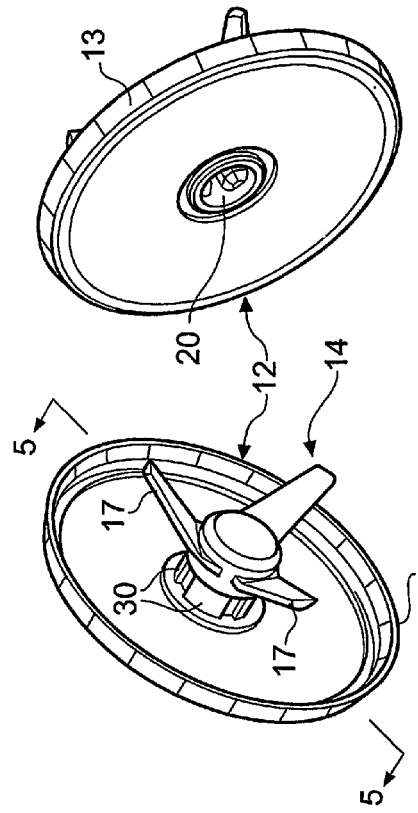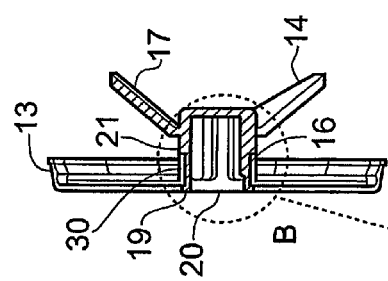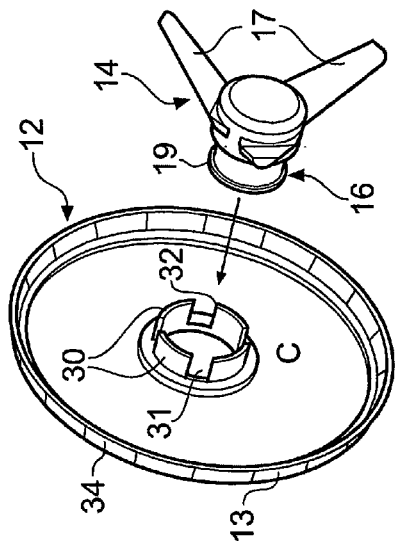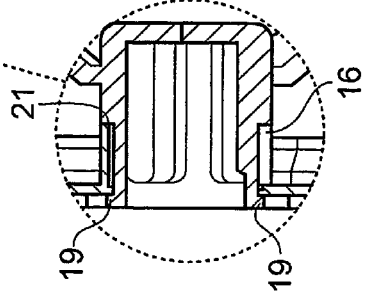

SECTION C-C

SECTION B-B

MIXING APPARATUS

This application is the U.S. national phase of International PCT Application No. PCT/GB2004/003432, filed Aug. 9, 2004, which designated the United States. PCT/GB2004/003432 claims priority of Great Britain Patent Application No. 0318584.0, filed Aug. 7, 2003. The entire contents of these applications are herein incorporated by reference.

This invention relates to mixing apparatus and, in particular, to mixing apparatus whereby food product can be mixed prior to consumption.

It has been proposed to provide mixing apparatus, more particularly blending apparatus, in which a container of product fitted with a lid is blended by blending apparatus within the container.

The present invention is intended to provide improved apparatus for mixing food products and which is specially adapted to be cost effective and sufficient for one trip use.

According to the invention there is provided mixing apparatus comprising a container base and a container lid, the container lid having mounted thereon mixing means, the mixing means extending through the lid and having, at one end, means for connection to a drive motor external to the container and, at the other end, a mixing element for mixing the contents of the container when the drive means is operated, the mixing means comprising a shaft portion locatable through an opening in the lid and incorporating the connection means, and a mixing element portion associated with the shaft portion for rotation therewith, the container lid comprising a rim portion defining a circumferential slot into which the top edge of the container is located when the lid and container are assembled.

Preferably the container lid rim portion is formed with successive, oppositely-directed circumferential portions, one of the portions lying closely adjacent to the inner side wall of the container when the lid and container are assembled, and defining one side of the slot, and extending into the container.

Conveniently the other of said circumferential portions is spaced inwardly of the side wall and has a curvilinear join with said one portion.

In one arrangement the circumferential slot is defined by an outer portion arranged to extend around the outer top edge of the container, and an inner portion arranged to extend into the container and the inner portion extends over a greater distance than the outer portion in the axial direction of the container, such distance being between twice and six times said distance.

In one arrangement, the mixing element portion includes an opening through which the shaft portion is located to lock into said opening.

The mixing means is assembled on to the lid, the shaft portion being first inserted through one end of the lid opening, and then the mixing element portion is locked onto the shaft portion at the opposite end of the shaft.

It is also possible to have one piece mixing means which is assembled with the lid as one piece.

Preferably the mixing portion clips onto the shaft portion and is secured thereto by shoulder means on the shaft portion. The mixing and shaft portions may be united by welding them together.

The apparatus may comprise a support for an assembled container and lid with the lid located on the support, and a clamping member movable to engage the end of the container opposite the lid and locate the assembly during operation of the mixing means in which the clamping member is reciprocally movable and, upon contacting the container to clamp the assembly, applies a predetermined force to the container in the direction towards the support.

In one arrangement the clamping member is connected to a fixed member through spring means and, upon the clamping force exceeding a predetermined level, the spring means compresses and a signal is generated to stop movement of the clamping member. In such arrangement the clamping member may include a clamping surface engageable with the container and extending beyond the side edges of the container and comprising switch means for detecting an obstruction to a clamping action.

Conveniently, the container lid is nestable or stackable with other container lids, one being located inside the other.

Container lids assembled with the mixing means are also, preferably, arranged to be stackable or nestable.

Lubrication and/or cooling means may be provided to permit the contents of the container, during mixing, to contact and lubricate and/or cool the co-operating surfaces of the shank portion and the opening into the lid. Such lubricating means may include longitudinal slots in the side walls of the opening which constitute a sleeve.

A container lid may include a product access opening with closure means so that, after completing a mixing operation, the opening is openable to access the contents.

The container lid may include holding means for holding product arranged to be mixed with the material in the container before, during or after operation of the mixing means. The holding means may include a pocket having an opening for introducing the product into the pocket.

The pocket may have mesh means for permitting product in the container to enter into the pocket.

The pocket may be arranged to contain carbonation means for carbonating product in the container. Alternatively or in addition the pocket may contain flavour or other additives for the product.

Figure 2:
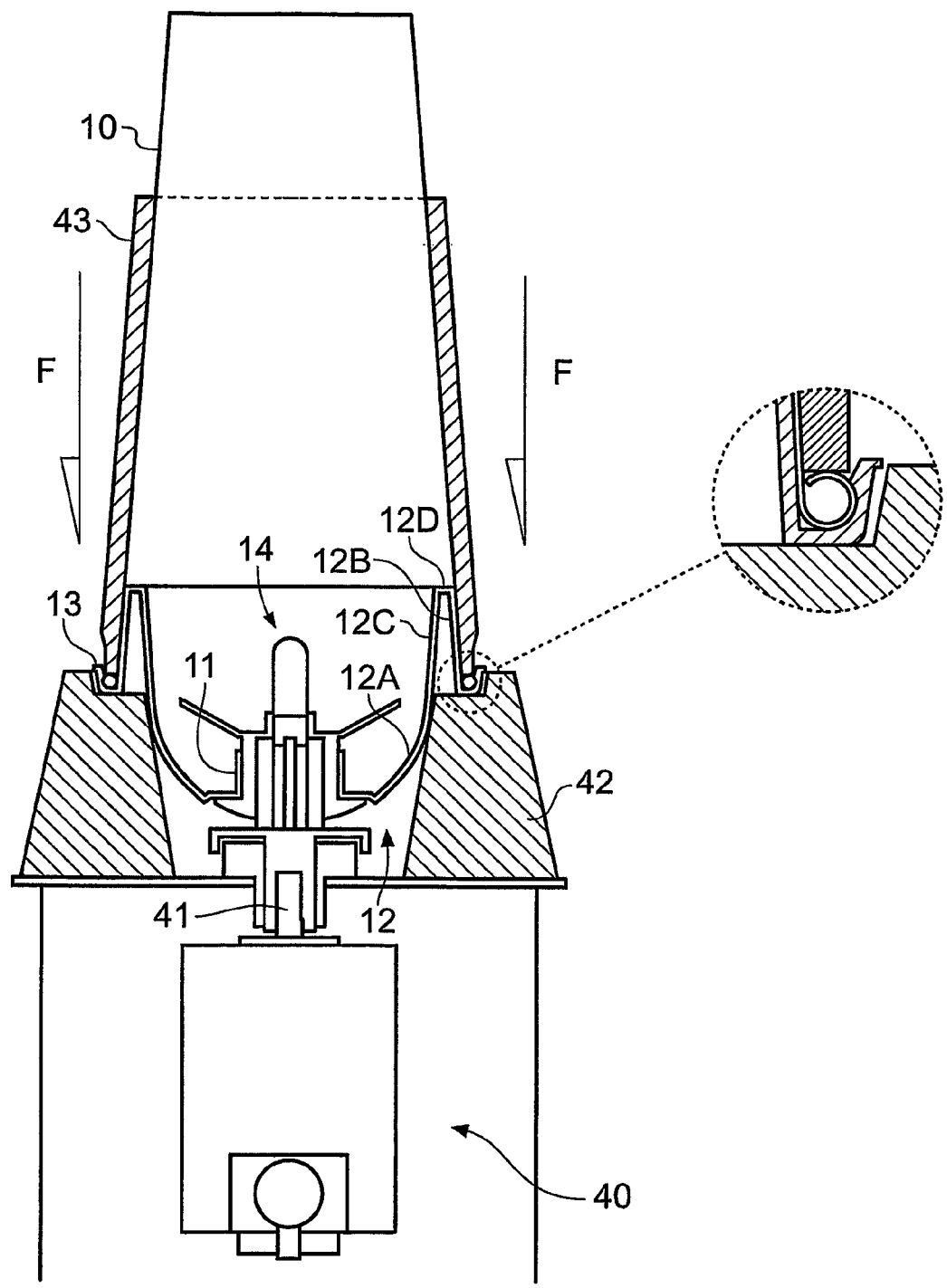
Figure 3:
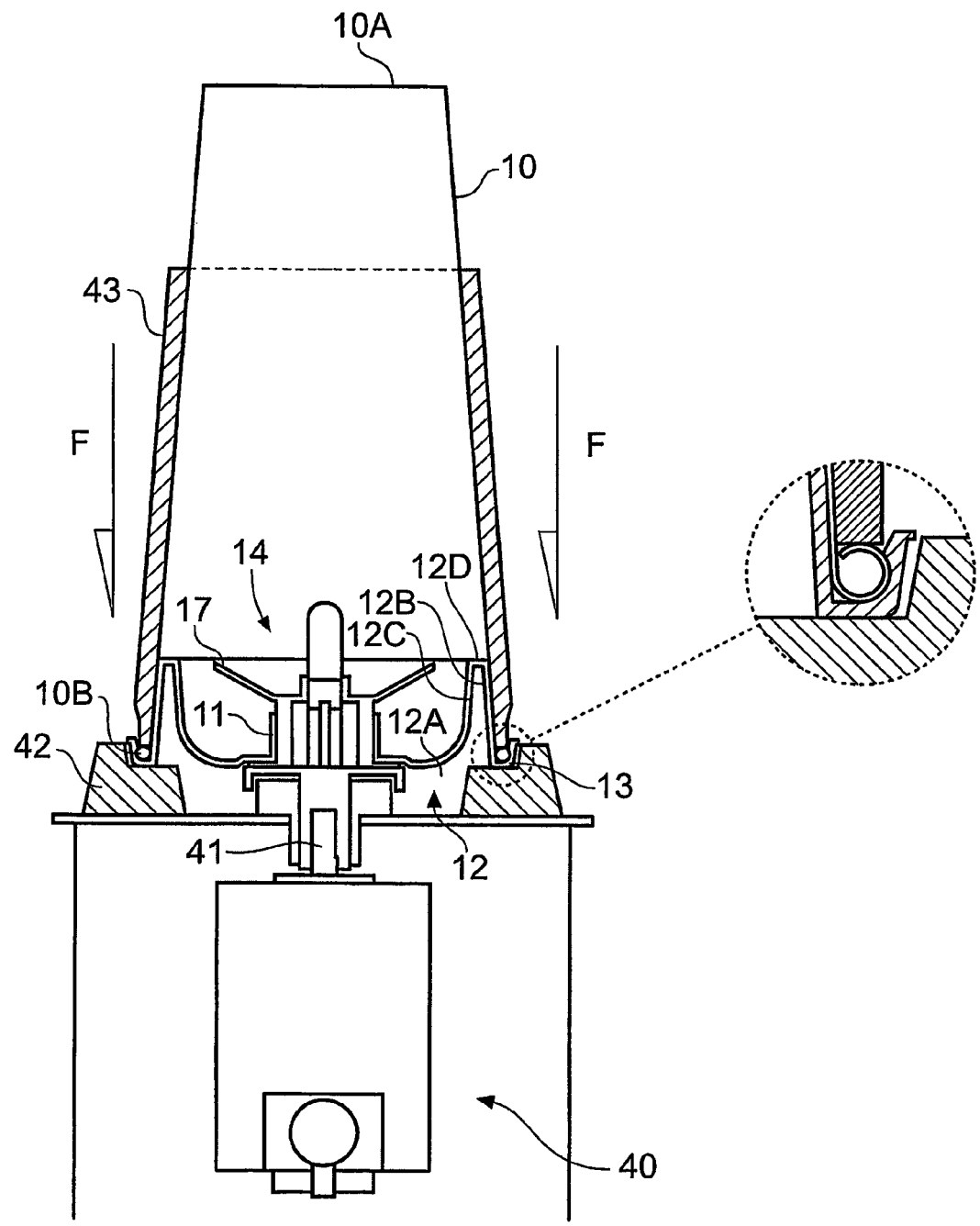
Figure 9:
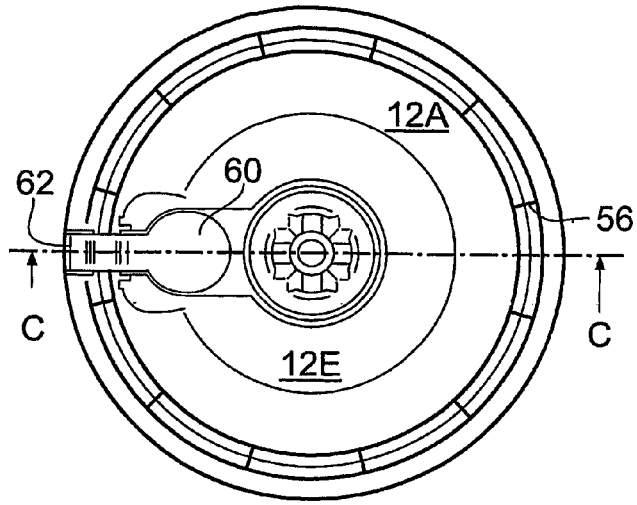
Figure 9A:
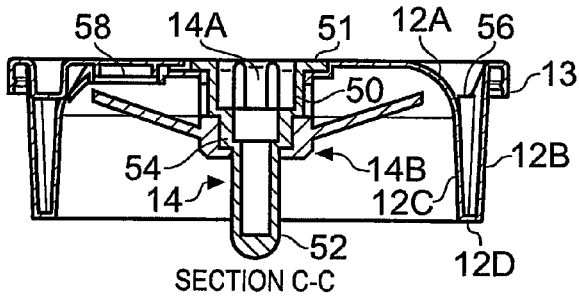
Figure 8:
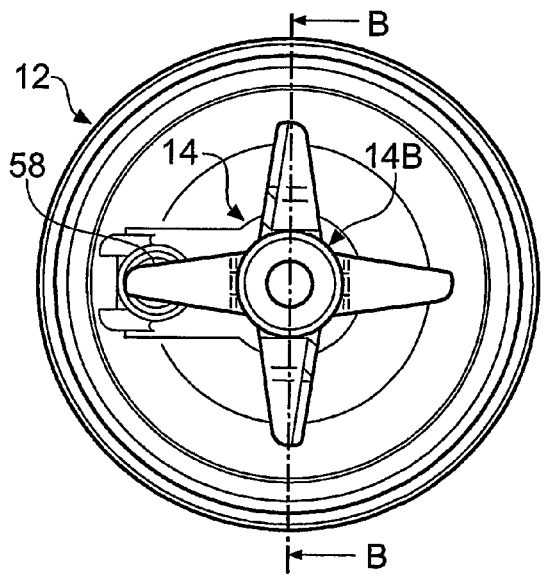
Figure 8A:
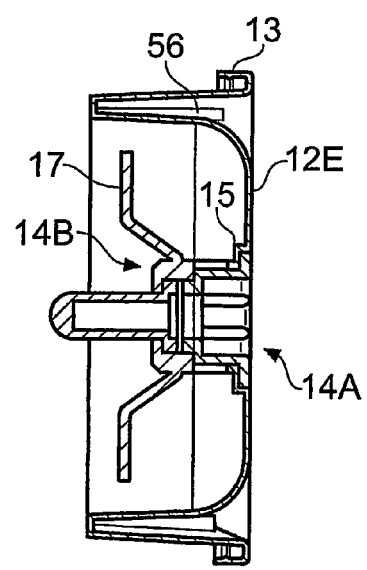
Figure 10:
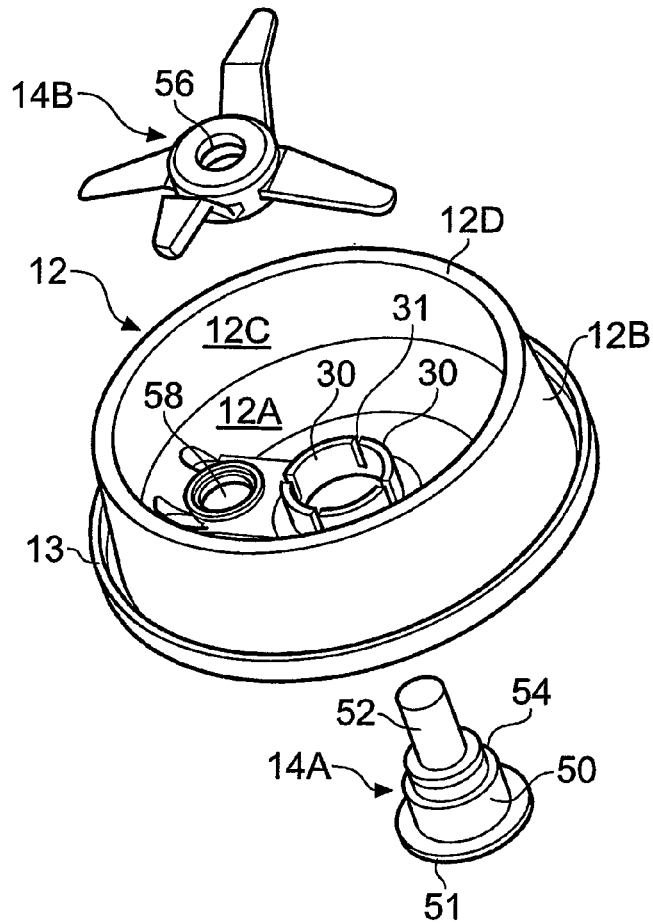
Figure 11:
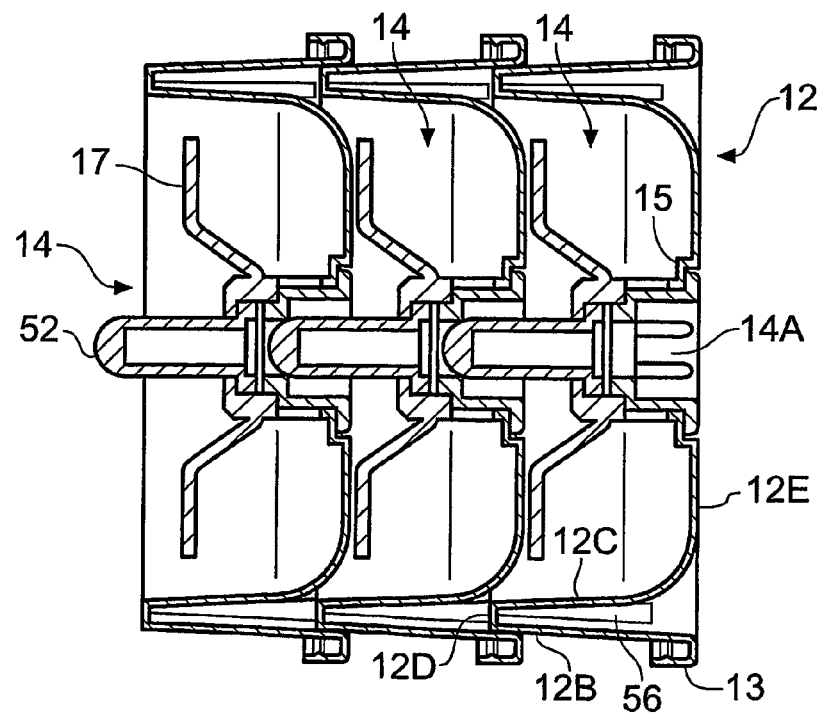
Figure 12:
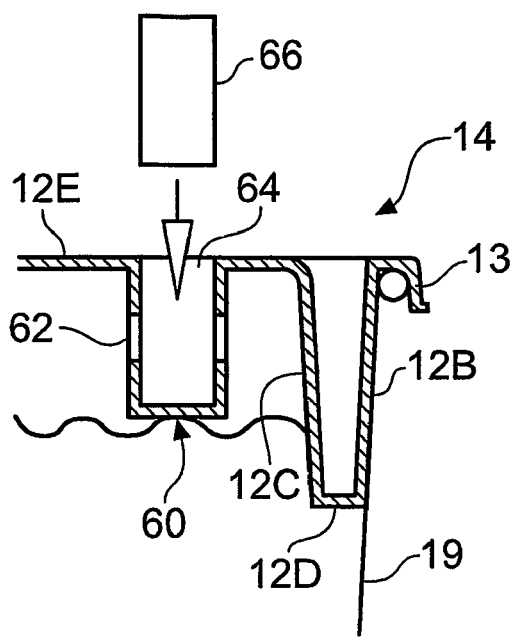
Figure 13:
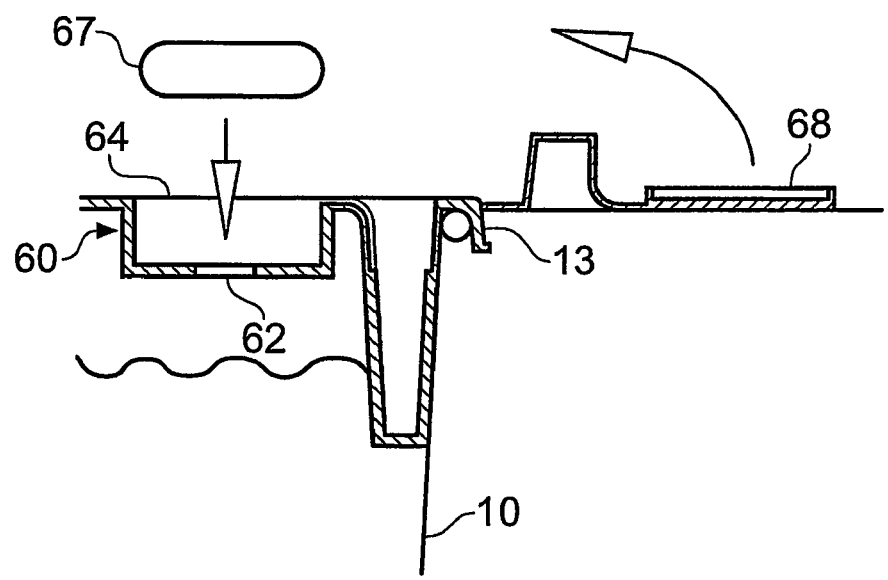
Figure 14:
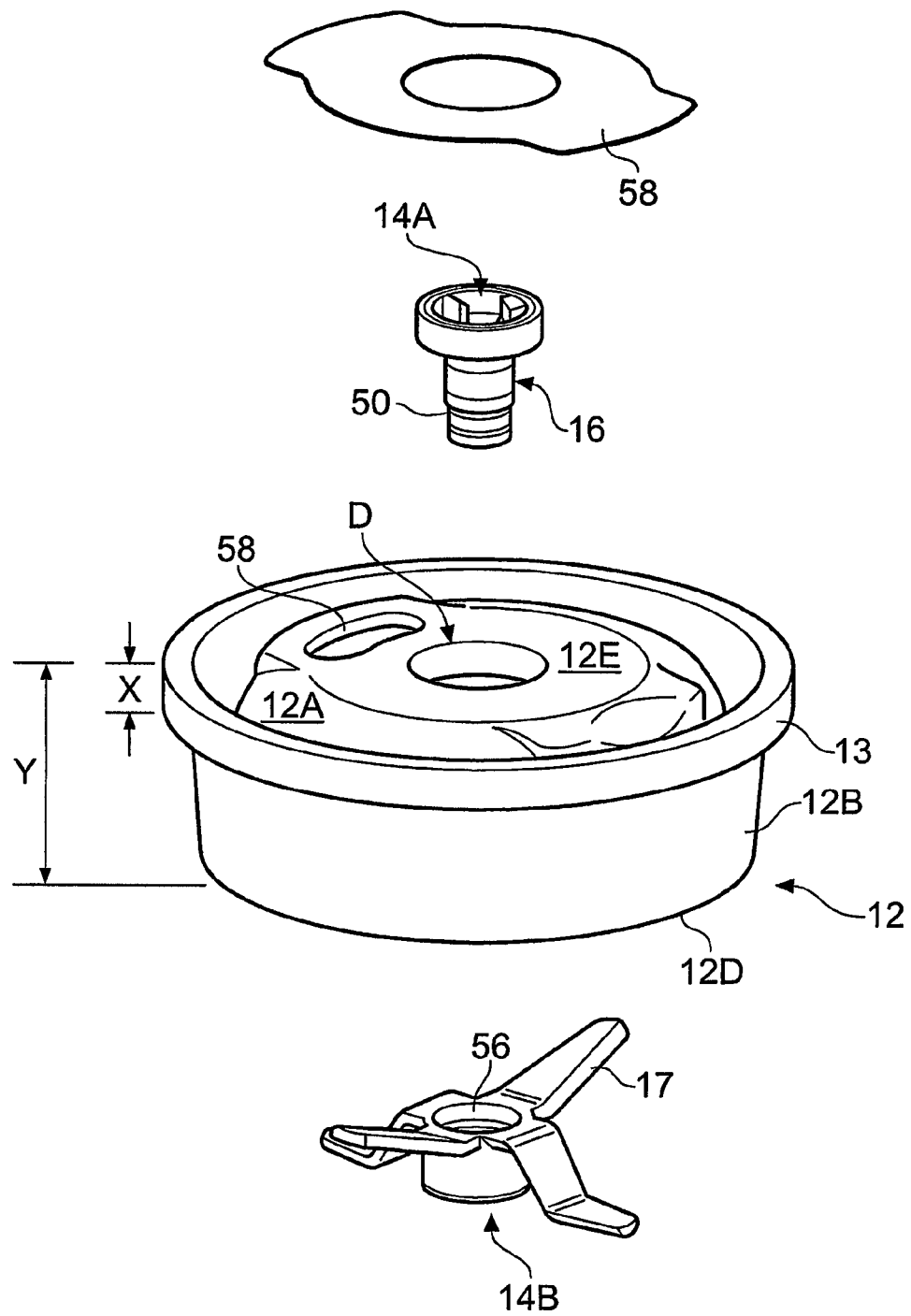
Figure 15:
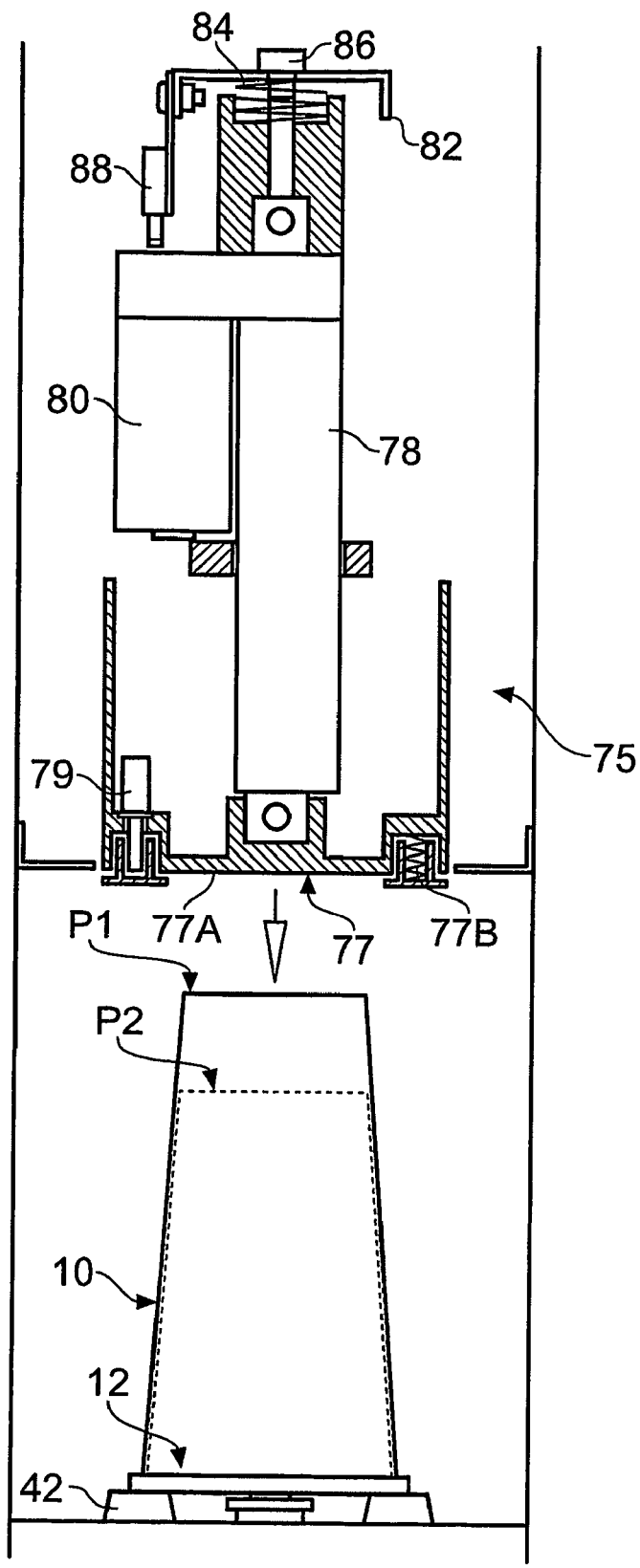
Figure 16:
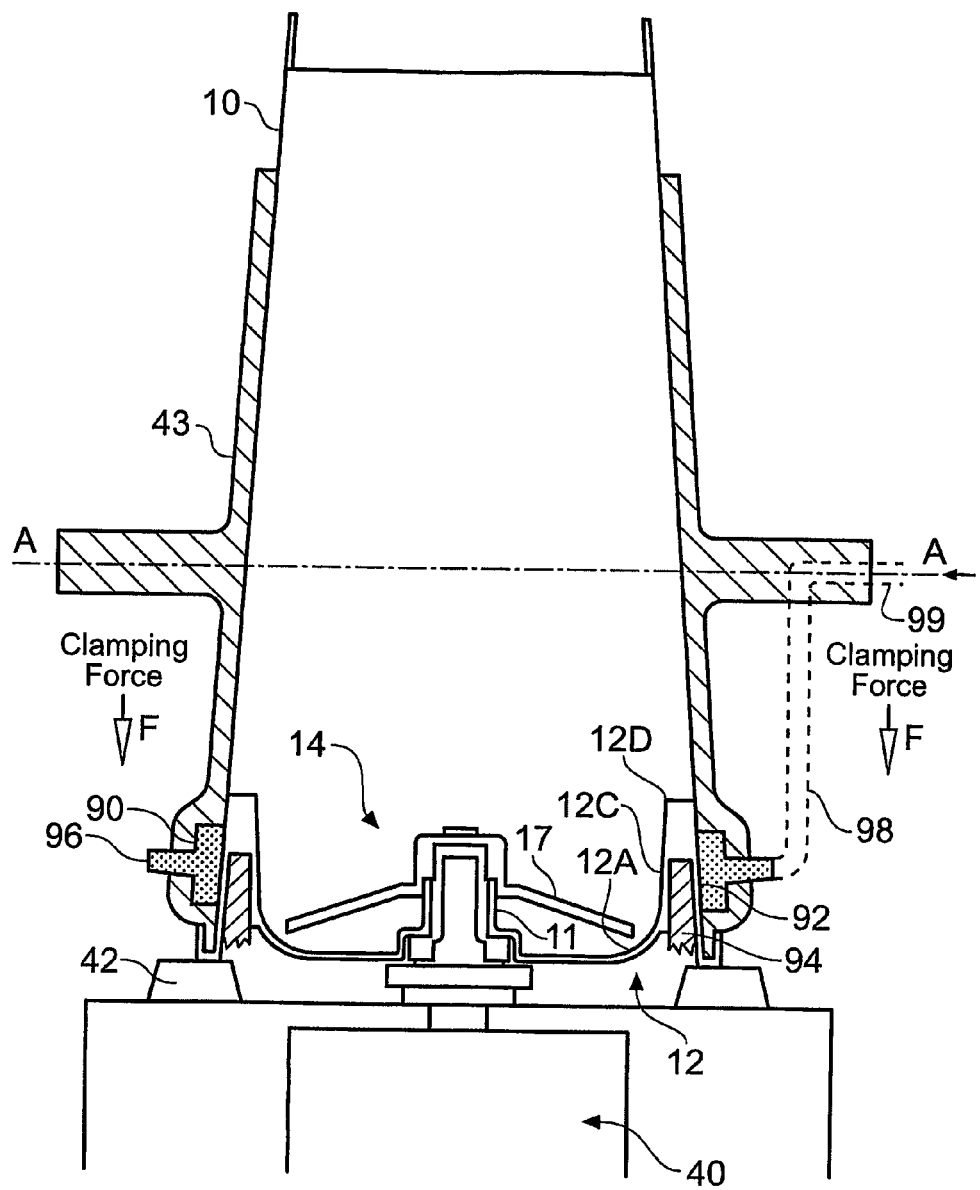

Further features of the invention appear from the following description of various embodiments of the invention given by way of example and with reference to the drawings, in which:

FIG. 1 is a vertical cross section through one embodiment of the mixing apparatus, FIG. 2 is a vertical section corresponding to that of FIG. 1 of another embodiment, FIG. 3 is a vertical section corresponding to those of FIGS. 1 and 2 of a further embodiment of the invention, FIG. 4 is a perspective view of the underside of a lid for the mixing apparatus, FIG. 5 is cross section on the line 5-5 in FIG. 4, FIG. 5A is an enlarged detail of the cross section of FIG. 5, FIG. 6 is a view corresponding to FIG. 4 showing the blending element disassembled from the lid, FIG. 7 is a view of the lid of FIG. 4 from the opposite side, in perspective, FIG. 8 is a plan view from beneath of a lid and blender element assembly of another embodiment of the invention, FIG. 8A is a section on the line B-B in FIG. 8, FIG. 9 is a view corresponding to FIG. 8 from the opposite side of the assembly, FIG. 9A is a section on the line C-C in FIG. 9, FIG. 10 is a perspective view of the assembly of FIGS. 8-9 showing the blender element assembled, FIG. 11 is a sectional view of a stack of assemblies of the kind shown in FIGS. 8-10, FIG. 12 is a scope view of part of a lid, FIG. 13 is a similar view to FIG. 12 of an alternative arrangement, FIG. 14 is a scope view, in perspective, of a lid with blending means, FIG. 15 is a vertical section through blending apparatus, and FIG. 16 is a vertical section through other blending apparatus.

Referring to the drawings and firstly FIGS. 1-3, there is shown three versions of mixing apparatus of which each comprises common elements including a container or container base 10, usually in the form of a paper cup tapering inwardly towards the lower end 10A and having towards the upper end a rolled lip 10B. Instead of the container 10 being formed of paper, it may be of plastics, for example of injection moulded plastics.

In use, the container is assembled with a lid 12 with a turned over peripheral edge 13 which is fitted over the lip or rim 10B and carries assembled therewith a blending element 14 arranged for rotation relative to the lid 12.

The blending element 14 is rotated by a drive motor 40 having an upwardly directed drive shaft 41 arranged to engage with the blending element 14 for driving engagement during the blending operation.

In FIGS. 1-3, the container 10 and assembled blending element 15 with lid 12 are shown inverted in a position in which product within the container is blended. In this position, the container is inverted with the lid 12 lowermost and the assembly is supported on an annular supporting member 42 which locates under the outer edge of the lid 12.

The container 10 is supported and seated in a tapered seating or holder 43 which is tapered to the outer shape of the container 10 and extends towards the upper end of the container so that the upper edge of the holder 43 engages under the container lip 10B. This arrangement of holder 43, shaped seating 42 and the upper edge of the lid 12 ensures in each case that the seal between the lid and the container is maintained through all stages of the operation of the blending apparatus, including when the container is inverted, and when the blender is operating prior to blending, the container is located in the holder when upright or inclined towards the user.

Usually the holder 43 is initially in an upright or vertically inclined position with its wider end uppermost. The container 10 is located in the holder by dropping the assembled container and lid into the holder. The holder is then inverted to the position shown in which the lid is located onto the support 42 with the blending element 14 located over the drive motor 40. A downwards clamping force F is usually applied to the holder 43 to maintain it in its inverted position ready for a blending operation. The motor 40 is operated and the drive shaft 41 engages the blending element 14 through an opening 20 directed outwards from the lid 12. Rotation of the drive 41 causes the blending element 14 to rotate within product located within the container 10. This action blends the product or otherwise mixes it to ensure that it is adequately mixed or blended within the container.

When the mixing action has taken place for the required length of time, the clamping force F is released, the drive shaft 41 is disengaged from the blending element 14 and the cup holder with the container therein is removed from the support 42, inverted and released from the holder 43 and the product within the container is ready for consumption. As thus far described it is assumed that the contents of the container to be blended are at the temperature and consistency required but, if necessary, the contents may be heated or cooled prior to the blending operation. In the case of product which needs to be heated, this may be achieved by directing microwave radiation at product within the container prior to or when in situ on the blending apparatus.

It will be seen that the embodiments of FIGS. 1, 2 and 3 differ from each other primarily in the shape of the lid 12. Thus in the case of the FIG. 1 embodiment, the lid 12 is generally planar lying generally at a right-angle to the central axis of the container. The lid 12 is formed with a central circular opening 11 defined by downwardly, axially projecting members 13 flanked by a depression 15.

In FIG. 2, the lid 12 is of more complex form, although still having an outer rim 13 and a central opening 11. In FIG. 2, the lid is formed with a part spherical central portion 12A in the middle of which is the opening 11, and the outer edge of the spherical portion 12A is turned through approximately 180 degrees to form an outer portion 12B in alignment with and closely adjacent the inner walls of the container 10 towards the upper edge thereof The semi-spherical portion 12A, as shown has a tangential portion 12C and the transition between the portions 12C and 12B is through right-angle bends at 12D. Alternatively, the bends 12D may be replaced by a curvilinear transition.

It will be seen that the portion 12D is below the level of the upper end of the container and that the semi-spherical portion 12A projects above the upper edge of the container and the portion 12A may provide a transparent region through which the internal part of the container may be viewed. It will also be noted that the region in which the blending element 14 is operated, when in the inverted position, as shown, is a partial sphere which assists in ensuring an efficient blending operation of product in the container. The edge of the container opening is located between portions 12B and 13 of the lid which together define a circumferential slot, the radially inner side of which extends along the inner wall of the container and in contact therewith.

The arrangement of FIG. 3 shows a further alternative form of lid 12, somewhat similar to the lid 12 of FIG. 2 but in which the part semi-spherical portion 12A is of reduced dimensions so that the upper end of the portion 12A lies substantially level with the upper end of the container 10.

The arrangement of FIG. 3 still provides a region in which the blender 14 operates which has curved lower surfaces to assist in ensuring an adequate blending action, and the lid may be of transparent material.

The embodiments of FIGS. 2 and 3 are particularly useful in ensuring a good seating of the lid 12 on the container 10 to reduce the possibility of any leakage or unseating of the lid from the container. One way in which this is achieved is for the portion 12B of the lid 12 to extend along the inner side walls of the upper end of the container giving excellent sealing qualities and a seating within the container. This arrangement also permits a minimal loss of capacity of the container and this can be overcome by allowing the portion 12A of the lid of the container to project beyond the upper end of the container. The use of a cup holder 43 further assists in maintaining a seal between the rim 10B and the lid 12, as shown enlarged in FIGS. 1, 2 and 3. Details of the construction of the blender 14 and its associated lid are as described in relation to the later described embodiments. The extent to which the portion 12B extends into the container can be varied in obtaining an adequate seal. It is preferred that the axial extent of the portion 12B be between two and twelve times the depth of the outturned edge 13. That is (FIG. 8A) Y=between 2× and 12×.

Referring now to FIGS. 4-7, there is shown a lid 12 and associated blending element 14 of which similar parts are given the same reference numerals as in the preceding embodiment. The blending element 14 is of one piece construction and has a shaft 16 at one end of which is an outwardly projecting lip 19. At the other end of the shaft 16 is located a set of blending blades 17 which extend generally radially outwards from the axis.

The shaft 16 is located into a central opening in the lid 12 and around the opening, integral with the lid, are formed arcuate, axially-directed elements 30 which are circumferentially spaced from one another to leave gaps 31. Along each edge of each element 30 there is formed an angled surface 32 and by provision of the gaps 31 and the angled surfaces 32 there is provided means for admitting product within the container during blending into the small space between the shaft 16 and the elements 30. By this means the outer surface of the shaft is lubricated and cooled. This may be necessary since the blending element 14 can be rotated at high speed during a blending operation and the shaft 16 is of relatively large diameter to provide structural strength to the element 14. If product being blended is cold and the blending process is short, such lubrication may not be necessary but lubrication is desirable. Since the container is normally inverted during blending, the blending element 14 is immersed in the product and product gains access to the outer surface of the shaft 14. Such product provides a film of lubricant/coolant between the shaft and the element 30.

The shaft 16 is located in the opening by applying axially directed pressure while entering the shaft 16 into the opening and when the lip 19 has extended through the opening it locates into a recess at the outer end of the opening to secure the blending element to the lid. The outer end of the element 14 is formed with an internal depression and shape, as at 20, to enable the drive shaft 41 to enter and fully engage in the opening 20 and drive the blending element 14 during a blending operation. The fitting of the shaft 41 in the opening is intended to bring about a strong connection during vigorous blending, which may include blending ice cream.

In the arrangement of FIGS. 4-7, the outer rim 13 of the lid is formed with slits 34 extending in a generally axial direction from the rim 14 towards the top of lid. Such slits 34 assist in locating the lid on the container, the rim being able to be flexed outwards during such engagement. This may be of particular importance when the container is made from paper/cardboard. This arrangement also has application when the lid is arranged to be fitted to containers which are of slightly different sizes since the flexibility provided by the slits permits the lid to be fitted to different size containers with different size rims. The slits may have a width of some 1 mm and extend to closely adjacent the inner edge of the rim.

Referring now to the lid assembly of FIGS. 8-10, the same reference numbers are used for similar parts to those of the previous embodiments and the lid assembly of FIGS. 8-10 corresponds with that of FIG. 3. It will be seen that the blender element is, in this case, formed of two portions (see in particular FIG. 10) of which one portion 14A is termed a shaft portion and the other portion 14B is termed a blade portion. The shaft portion 14A is formed with a cylindrical portion 50 which is located within the opening in the lid defined by the elements 30 which together define bearing surfaces for the blending element 14. At one end of the cylindrical portion 50 is a flange 51 which locates in the depression 15 formed around the central opening in the lid to thereby secure the blending element at one end thereof.

The portion 14A has a further cylindrical part 52 about which is located the bladed portion 14B of the element in use. Intermediate the portions 50 and 52 is provided a portion 54 in which can be seated the bladed portion 14B, when assembled.

In practice, the shaft portion 14A is inserted into the opening in the lid, then from the opposite side of the lid is introduced the bladed portion 14B having a central opening 56 into which is inserted the portion 52. The bladed portion 14B is then pushed over the shaft portion 14A to locate the two portions together and the portions are then locked in position by engaging the inner edge of the opening 56 into a groove on the portion 54 or a shoulder is provided on the portion 52 over which the bladed portion 42 is located to prevent release.

With this arrangement, the two portions 14A and 14B are locked together as one, after fitting to the lid 12 and are rotatable relative to the lid within the opening to enable the blending action to be performed.

The outer side of the blending element 14 lies flush with the upper surface of the lid to provide a neat appearance and, once assembled, the lids and blending elements are nestable together for transportation purposes, as seen in FIG. 11. To assist in such nesting together, there is provided lugs 56 against which the portions 12D of the lid are arranged to engage.

In order to provide for easy access to product to be consumed from the container 10, the lid is provided with an opening 58 displaced to one side of the central axis and having to the upper open side a closure member 60 which locates into the aperture 58 and is hinged at 62 to enable the closure 60 to be opened and closed according to the requirements of the user.

Referring now to FIG. 11, there is shown a series of lids of the kind illustrated in FIGS. 8-9 which have been nested together after manufacture and assembly of the blending elements with the lids. The same reference numerals are used in relation to the same parts. It will be seen that the portions 12D locate in the gap between the portions 12C and 12B on an adjacent lid but the portion 12D engages up against lugs 56 whereby the lids may be readily denested from one another. However it is not essential that the lids be nestable.

The shaft portions 52 of the blending elements locate within the opening at the drive shaft end of the blending element when nested together. Flat portions of the blades 17 of the blending element 14 rest against the upper surface of the lids at 12E to assist in enabling the lids to be nested and denested.

This nesting facility permits the assembled lids and blending elements to be transported occupying limited volume to a location where the lids are to be assembled on to the container bases.

Referring now to FIG. 12, there is shown a detailed view of part of a lid similar to that of FIGS. 8-9 in which there is formed in the upper side of the lid in the region 12E a pocket 60 depending downwardly into the container and having opening 62 in the side walls giving access into the pocket from within the container. Towards the outer side of the pocket 60 is formed an opening 64 giving access into the pocket for a holder 66 which is shaped to be a close fit within the pocket 60, sealing the openings 62 and preventing product from passing out of the pocket 60 to the outside of the container.

The holder 66 may contain any additive which is required to make to the product during mixing but, in particular, additives which when contacted by the products within the container will react with the product to create a desired effect. In one arrangement the holder 66 contains material which when contacted by the product will carbonate the contents of the container. Such carbonation will commence when product in the container reaches the opening 62 and enters the holder 66. Reaction between the contents and the carbonation material will set up a carbonation action and this will take place when the container is inverted and the contents blended.

Referring now to FIG. 13 an arrangement for a similar purpose to that of FIG. 12 is provided and the same references are used for similar parts. The arrangement of FIG. 13 primarily differs in that rather than the holder 66 sealing the opening 64, the equivalent holder 67 of carbonating product is located in a pocket 60 which is provided with a closure member 68 which seals the opening 64 at the upper end of the pocket 60. The closure 68 is pivoted towards the side edge 13 of the lid to be moved about the pivot between an open condition, as shown, and a closed condition in which the closure 68 has been pivoted into position over the opening 64.

The holder 67 of this embodiment may be in the form of a liquid permeable bag and arranged so that upon contact by the contents of the container, the carbonation material is activated to release carbon dioxide into the body of the product.

During use of the container and lid assembly various means can be employed to ensure good fitting together of the units to avoid leakage and ensure integrity of the assembly.

The fitting of the lid onto the container, as described, is intended to ensure this. Moreover rather than having to rely on the operator, the assembly can, at the filling location, or, if filling takes place at the dispensing location, be provided with a clamping mechanism whereby after the fitting the lid to the container a pressure plate or other clamp is applied between the ends of the container and lid until a predetermined pressure has been reached and this pressure is released. The assembly can then be inverted and the product is ready to be blended.

After fitting the lid to the container the parts may be united by heat sealing or otherwise.

Referring now to FIG. 14 in which the same reference numbers are given to similar parts of the previous embodiments, an alternative form of lid 12 and associated blending means is shown. The lid 12 is similar to that shown in FIGS. 3, 8 and 9 having an outer rim 13 which fits over the outer edge of a container end and an inner portion 12B which extends into the container in contact with or closely adjacent to the inner wall of the container towards its outer edge, the portion 13 and portion 12B defining between them a circumferential slot into which the open edge of the container is located.

As previously described the container lid has an outwardly convex portion 12A, 12E, which merges with the portion 12B through a turned over portion 12D.

Centrally of the outwardly convex portion 12A, 12E there is provided an opening O into which is to be located a two part blending means 14. The shaft part 14A of the blending means 14 has at one end connection means for connecting the blending means to the motor drive 41 and has a shaft 16 which over its outer surface 50 locates in an opening 56 in the blending element part 14B.

Assembly of the blending means with the lid 12 is by locating shaft part 14A through the opening O and through the opening 56 in the part 14B. The surface 50 may be formed with a shoulder to locate with the outer end of the opening 56, or the parts 14A and 14B may be welded together after assembly. The surface 50 locates with the surfaces of the opening O to define a bearing surface which is of relatively small diameter to reduce the potential for the bearing surfaces to overheat.

Also formed in the portion 12E of the lid 12 is an opening 58 which is provided as an access opening for accessing the contents of the container after blending, for example through a straw.

To be located over the opening 58 during blending is a removable closure or label 58A which is adhesively applied to the lid and is peelable therefrom when required.

Referring now to FIG. 15 there is shown an alternative arrangement for supporting an assembly of container 10 and lid 12 during a blending operation. The assembled container 10 and lid 12 are located inverted on a support 42 of a housing for the drive motor, as previously described.

Located above the assembly in the blending position is a clamping arrangement 75 including a reciprocal container engagement member 77 carried on the lower end of an actuator 78 which is in turn driven by an actuator motor 80 to move up and down towards and away from the container.

The clamping assembly is mounted on a rigid mounting bracket 82 for movement relative thereto through a compression spring 84, the assembly being movably supported by a support bolt 86. Movement of the assembly towards the bracket 82 is against the resistance of the compression spring 84 and there is also provided a switch 88 which detects movement of the actuator relative to the bracket 82 against the action of the spring 84.

The clamping member 77 is arranged to engage the narrow end of the container 10 to clamp it into position during blending and as the central portion 77A which is shaped to match the cross-section of the container to be engaged. Extending around the central area 77A is a safety ring 88 in the form of an annular ring movable relative to the member 77 against spring means 77B. Movement of the ring 88 against the spring means is detected by a switch 79 which, when actuated, stops movement of the actuator 78 and actuator motor 80. This arrangement ensures that obstructions between the member 77 and the container, such as an operator's fingers, are detected to stop operation of the clamping arrangement.

In operation of the clamping assembly of FIG. 15 after an assembly of container and lid has been placed on the support 42, the actuator motor is actuated to cause the clamping member 77 to move downwards into engagement with the end of the container. A predetermined pressure is applied to the end of the container to bring about a clamping action between the support 42 and the clamping member 77 and between the lid 12 and the container 10. This ensures that the assembly of container and lid is adequately made and support is sufficient during the blending operation. Due to the way in which the clamping arrangement is supported at its upper end there is detected a predetermined pressure on the container through movement relative to the bracket 22 which is detected by the switch 88 which is irrespective of the size of the container so the container can have an axial dimension at positions P1 or P2 or at any positions in between. Whatever the size of the container, as soon as the predetermined clamping pressure has been reached the clamping operation is complete and there is no further movement of the clamping member.

It will be appreciated that the blending apparatus can be programmed to operate according to the size of container used and the contents of the container which may require different blending times. As described blending apparatus detects the size of container which may also determine the blending duration. However, in addition, the operator can set the blending duration through the operator controls.

Referring now to FIG. 16 there is shown blending apparatus in which the same reference numbers are, again, given to parts similar to those of previous embodiments. The apparatus shown in FIG. 16 includes a container 10 and a combined lid 12 and blending means 14 which are of similar form to those shown in FIG. 3 and others of the drawings.

The assembled containers and lid are inverted for a blending operation to the position shown and such inversion can be done manually or by locating the containers 10 in a holder 43 shaped to the external shape of the container 10.

The holder 43 may be rotatable about axis A-A from an upright position in which the container is located into the holder, to an inverted position in which the blending means 14 is placed in driving engagement with the drive motor 40 for a blending operation.

The container 10 is generally made of stiff coated paper or card which is formed with an overlapped portion running in the lengthwise direction of the container. This construction can result in potential problems with leakage between the lid and the inside wall of the container where the overlap occurs.

In order to mitigate any potential leakage there is provided a clamping arrangement whereby the outer surface of the container adjacent the lid has applied to it inwardly directed clamping forces to assist in sealing the inner surface of the container against the inwardly directed portion of the lid which locates against said inner surface.

In the illustrated arrangement clamping is by providing an air chamber 90 extending around the outside of the container 10 towards its wide end and having a radially inner flexible wall 92 which is arranged to contact the outer wall of the container so that when the chamber 90 has compressed gas admitted the wall 92 is caused to extend radially inwards against the container wall. It compresses against the wall to seal the wall against the lid and thereby seal against any leaks.

To assist in the sealing action, there may be inserted into lid over the outwardly directed circumferential opening extending around the lid portion 12C, a circular abutment member 94. Thus, as the wall 92 filled with compressed gas to expand inwardly against the container wall, abutment member 94 acts as an abutment to resist such movement and act to assist as a seal.

Compressed gas to the chamber 90 is supplied by a suitable compressor through an inlet tube 96 and the tube 96 and chamber 90 are incorporated into the holder 43 which holder is directed downwardly to hold the assembly onto the base 42 during blending, as shown by the arrows F.

The chamber 90 is inflated or charged with gas at the commencement of the container inversion action and, upon completion of the blending, the tube is deflated so that the container with its blending contents can be removed from the holder 43.

Air to the chamber 90 may be ducted through tube 98 from an inlet 99 lying along the axis A so that the air can be ducted before and during blending and whilst the holder is rotated.

Instead of using the inflated ring arrangement shown in FIG. 16, a mechanical clamping arrangement can be used whereby a metal ring (not shown) in the position of chamber 90 extends around the container and is moved radially in and out to clamp the container.

Usually clamping around the container will be needed before the container is inverted, during blending, and until the container is upright again.

The invention claimed is:

1. Blending apparatus for a high speed blending operation comprising a container base and a container lid, the container lid having mounted thereon blending means arranged for a high speed rotation, the blending means extending through the lid and having, at one end, means for connection to a drive motor external to the container and, at the other end, a blending element for blending contents of the container when the drive means is operated, the blending means comprising a shaft portion locatable through an opening in the lid and incorporating the connection means, and a blending element portion associated with the shaft portion for rotation therewith, the container lid comprising a rim portion defining a circumferential slot into which the top edge of the container is located when the lid and container are assembled together, wherein the rim portion is formed with successive, oppositely directed circumferential portions, a first of said portions lying in contact with or closely adjacent an inner side wall of the container when the lid and container are assembled together, and defining one side of the slot, and wherein the slot is defined by an outer portion arranged to extend around a top outer edge of the container and an inner portion arranged to extend into the container, and wherein the lid has a part-spherical central portion in the middle of which is the opening for the blending means, the outer edge of the part-spherical central portion being turned through approximately 180° to form said first circumferential portion, and wherein the upper end of the central portion lies substantially level with the upper end of the container in use, and wherein the region in which the blending element operates has curved surfaces.

2. Blending apparatus according to claim 1 wherein the part-spherical central portion is of curvilinear dome shape.

3. Blending apparatus according to claim 1 wherein container lids assembled with the blending means are arranged to be nestable or stackable with other container lids, when not assembled with the container bases, one container lid being located inside another.

4. Blending apparatus according to claim 1 wherein the inner portion extends between two and twelve times the distance of the outer portion.

5. Blending apparatus according to claim 1 wherein the container lid includes a product access opening with closure means, the access opening being for accessing the contents of the container after blending.

6. A container lid for mounting on an open ended beverage container, the container lid having located thereon blending means arranged for high speed rotation, the blending means extending through an opening in the lid and having, at one end, means for connection to a drive motor external to the container and, at the other end, a blending element for high speed blending of contents of the container when the drive means is operated, the container lid comprising a rim portion defining a circumferential slot into which the top edge of a container is located when the lid and container are assembled together, wherein the rim portion is formed with successive oppositely directed circumferential portions, a first of said portions lying in contact with or closely adjacent an inner side wall of the container when the lid and container are assembled together, and defining one side of the slot, and wherein the slot is defined by an outer portion arranged to extend around a top outer edge of the container and an inner portion arranged to extend into the container, and wherein the lid has a part-spherical central portion in the middle of which is the opening for the blending means, the outer edge of the part-spherical central portion being turned through approximately 180° to form said first circumferential portion, and wherein the upper end of the central portion lies substantially level with the upper end of the container in use, and wherein the region in which the blending element operates has curved surfaces.

7. A container lid according to claim 6 wherein the part-spherical central portion is of a curvilinear dome shape.

8. A container lid according to claim 6 wherein the lid includes a product access opening with closure means, the access opening being for accessing the contents of the container after blending.

9. A container lid according to claim 6 wherein the rim includes slits extending in a generally axial direction.

10. Blending apparatus according to claim 1 wherein the lid includes an upper portion having an annular gap, the lid further including an annular lower portion which is intended to locate in the annular gap of a lid of the same kind and configuration when two or more of said lids assembled with their respective blending means are stacked one on top of another.

11. A container lid for mounting on an open ended beverage container, the container lid comprising:
  mixing means extending through the lid and having, at one end, means for connection to a drive motor external to the container and, at the other end, a mixing element for mixing the contents of the container when the drive motor is operated; and
  a rim portion defining a circumferential slot into which the top edge of the container is located when the lid and container are assembled, wherein the rim portion is formed with successive, oppositely directed circumferential portions, a first of said portions lying in contact with or closely adjacent the inner side wall of the container when the lid and container are assembled together, and defining one side of the slot, and wherein the slot includes an outer portion arranged to extend around the top outer edge of the container, and an inner portion arranged to extend into the container, and wherein the lid has a part-spherical central portion in the middle of which is the opening for the mixing means, the outer edge of the part-spherical central portion being turned through approximately 180° to form said first circumferential portion, and wherein the upper end of the central portion lies substantially level with the upper end of the container in use, and wherein the region in which the mixing element operates has curved surfaces.

12. Blending apparatus according to claim 1, wherein a second of said circumferential portions forms part of the convex portion of the lid, and wherein the lid includes an upper portion having an annular gap, the lid further including an annular lower portion which is intended to locate in the annular gap of a lid of the same kind and configuration when two or more of said lids assembled with their respective blending means are stacked one on top of another, the circumferential portions defining said annular gap and said annular lower portion.

13. A container lid according to claim 6, wherein a second of said circumferential portions forms part of the convex portion of the lid, and wherein the lid includes an upper portion having an annular gap, the lid further including an annular lower portion which is intended to locate in the annular gap of a lid of the same kind and configuration when two or more of said lids assembled with their respective blending means are stacked one on top of another, the circumferential portions defining said annular gap and said annular lower portion.

14. Blending apparatus according to claim 5, wherein the product access opening is formed in said part-spherical central portion.

15. A container lid according to claim 8, wherein the product access opening is formed in said part-spherical central portion.

* * * * *